(12) United States Patent
Yu

(10) Patent No.: US 6,418,240 B1
(45) Date of Patent: *Jul. 9, 2002

(54) MULTIPLE FRAME IMAGE COMPRESSION AND DECOMPRESSION OF MOTION VIDEO

(75) Inventor: Raymond Yu, Fremont, CA (US)

(73) Assignee: Alaris Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,450

(22) Filed: Dec. 3, 1997

(51) Int. Cl.$^7$ .................................................. G06K 9/36
(52) U.S. Cl. ...................... 382/232; 382/236; 348/430.1
(58) Field of Search ................................ 382/232, 236, 382/233; 348/397, 398, 407, 415, 416, 430.1, 431.1

(56) References Cited

U.S. PATENT DOCUMENTS

| | | | |
|---|---|---|---|
| 3,922,493 A | * 11/1975 | Brenig et al. ................ 370/477 |
| 5,315,670 A | 5/1994 | Shapiro ........................ 382/56 |
| 5,412,741 A | 5/1995 | Shapiro ....................... 382/232 |
| 5,506,866 A | * 4/1996 | Bremer et al. ............... 375/216 |
| 5,546,477 A | 8/1996 | Knowles et al. ............. 382/242 |
| 5,600,373 A | 2/1997 | Chui et al. ................... 348/397 |
| 5,602,589 A | 2/1997 | Vishwanath et al. ........ 348/398 |
| 5,604,824 A | 2/1997 | Chui et al. ................... 382/248 |
| 5,638,068 A | 6/1997 | Nickerson ..................... 341/67 |
| 5,661,822 A | 8/1997 | Knowles et al. ............. 382/233 |
| 5,798,726 A | * 8/1998 | Schuchman et al. .......... 342/37 |
| 5,909,251 A | * 6/1999 | Guichard et al. ............ 382/236 |

* cited by examiner

Primary Examiner—Von J. Couso
(74) Attorney, Agent, or Firm—Blakely Sokoloff Taylor & Zafman

(57) ABSTRACT

A method and apparatus for performing multiple frame image compression and decompression of motion video data are provided. In one embodiment, a plurality of sequential frames in a motion video sequence are collected and digitally filtered as a single image. At least some of the results of the digital filtering are then encoded to generate compressed data. In another embodiment, a plurality of sequential frames are filtered as if the boundary of each frame is adjacent to a boundary in the same spatial location of another of the plurality of sequential frames.

66 Claims, 4 Drawing Sheets

MULTIPLE FRAME IMAGE COMPRESSION AND DECOMPRESSION OF MOTION VIDEO

CROSS-REFERENCE TO RELATED APPLICATIONS

Not Applicable.

BACKGROUND OF THE INVENTION

1. Field of the Invention

The invention relates to the field of motion video compression and decompression.

2. Background Information

Motion video data usually consists of a sequence of frames that, when displayed at a particular frame rate, will appear as "real-time" motion to a human eye. A frame of motion video comprises a number of frame elements referred to as pixels (e.g., a 640×480 frame comprises over 300,000 pixels). Each pixel is represented by a binary pattern that describes that pixel's characteristics (e.g., color, brightness, etc.). Given the number of pixels in a typical frame, storing and/or transmitting uncompressed motion video data requires a relatively large amount of computer storage space and/or bandwidth. Additionally, in several motion video applications, processing and displaying a sequence of frames must be performed fast enough to provide real-time motion (typically, between 15–30 frames per second).

Techniques have been developed to compress the amount of data required to represent motion video, making it possible for more computing systems to process motion video data. Typical compression techniques compress motion video data based on either: individual pixels (referred to as pixel compression); blocks or regions of pixels in a frame (referred to as block compression); individual frames; or some combination of these techniques.

Pixel compression techniques tend to be easier to implement and provide relatively high quality (U.S. patent application, Ser. No. 08/866,193. filed May 30, 1997). However, pixel compression techniques suffer from lower compression ratios (e.g., large encoding bit rates) because pixel compression techniques consider, encode, transmit, and/or store individual pixels.

In contrast to pixel compression, block compression systems operate by dividing each frame into blocks or regions of pixels. Block compression is typically based on a discrete Fourier transform (DFT) or a discrete cosine transform (DCT). In particular, each region of pixels in the first frame in a sequence of frames is DFT or DCT encoded. Once encoded, the first frame becomes the "base frame." To achieve a higher degree of compression, block compression systems attempt to compress the next new frame (i.e., the second frame) and all subsequent frames in terms of previously DFT/DCT encoded regions where possible (referred to as interframe encoding). Thus, the primary aim of interframe compression is to eliminate the repetitive DFT/DCT encoding and decoding of substantially unchanged regions of pixels between successive frames in a sequence of motion video frames.

To perform interframe compression on a new frame, the pixels in each region of the new frame are compared to the corresponding pixels (i.e., at the same spatial location) in the base frame to determine the degree of similarity between the two regions. If the degree of similarity between the two regions is high enough, the region in the new frame is classified as "static." A static region is encoded by storing the relatively small amount of data required to indicate that the region should be drawn based on the previously encoded corresponding region of the base frame. In addition to classifying regions as "static," interframe compression techniques typically also perform motion estimation and compensation. The principle behind motion estimation and compensation is that the best match for a region in a new frame may not be at the same spatial location in the base frame, but may be slightly shifted due to movement of the image(s)/object(s) portrayed in the frames of the motion video sequence. If a region in a new frame is found to be substantially the same as a region at a different spatial location in the base frame, only the relatively small amount of data required to store an indication (referred to as a motion compensation vector) of the change of location of the region in the new frame relative to the base frame is stored (U.S. patent application, Ser. No. 08/719,834, filed Sep. 30, 1996). By way of example, MPEG (a standard for Block Compression ) performs a combination of: 1) intraframe compression on the first frame and on selected subsequent frames (e.g., every four frames); and 2) interframe compression on the remaining frames.

In contrast to both pixel compression and block compression, frame compression systems operate on one entire frame at a time. Typical frame compression systems are based on decomposing a frame into its different components using a digital filter, and then encoding each component using the coding technique best suited to that component's characteristics. To provide an example, subband coding in a technique by which each frame is decomposed into a number of frequency subbands, which are then encoded using the coding technique best suited to that subband's characteristics. As another example, various references describe different frame compression systems that are based on using wavelets to decompose a frame into its constituent components (e.g., U.S. Pat. Nos. 5,661,822; 5,600,373).

When using a digital filter in frame compression systems, a problem arises due to the lack of input data along the boundaries of a frame. For example, when a digital filter begins processing at the left boundary of a frame, some of the filter inputs required by the filter do not exist (i.e., some of the filter inputs are beyond the left boundary of the frame). Several techniques have been developed in an attempt to solve the problem of the digital filter input requirements extending beyond the boundaries of a frame. As a example, one technique uses zero for the nonexistent filter inputs. Another technique called circular convolution joins the spatially opposite boundaries of the image together (e.g., the digital filter is performed as if the left boundary of the frame is connected to the right boundary of the frame). In another system, a different wavelet is used at the boundaries (see U.S. Pat. No. 5,661,822). In still another system, the image data at the boundaries is mirrored as illustrated below in Table 1.

TABLE 1

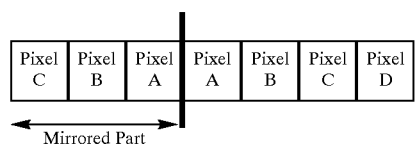

Mirrored Part

BRIEF SUMMARY OF THE INVENTION

A method and apparatus for performing multiple frame image (or super frame) compression and decompression of motion video data is described. According to one aspect of the invention, a plurality of sequential frames in a motion video sequence are collected and digitally filtered as a single image. At least some of the results of the digital filtering are then encoded to generate compressed data. According to another aspect of the invention, the plurality of sequential frames are filtered as if the boundary of each frame is adjacent to a boundary in the same spatial location of another of the plurality of sequential frames.

According to another aspect of the invention, a computer system is described including a processor and a memory. The memory provides a buffer for processing a plurality of frames of a motion video sequence as a single image. In addition, a plurality of instructions are provided, which when executed by the processor, cause the processor to generate compressed data representing the motion video sequence by decomposing the single image and compressing at least some of the resulting wavelet coefficients. According to another aspect of the invention, the decomposition is performed such that at least one boundary of a frame in the single image is processed as if it were adjacent to the same boundary of another frame in the single image.

BRIEF DESCRIPTION OF THE DRAWINGS

The invention may best be understood by referring to the following description and accompanying drawings which are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

A method and apparatus for performing multiple frame image (or super frame) compression and decompression of motion video data is described. According to one aspect of the invention, multiple frames of a motion video sequence are grouped to form a multiple frame image that is compressed as a single image (or super frame). This is in contrast to the previously described techniques that operated on at most one frame of a motion video sequence at a time. According to another aspect of the invention, the frames in each multiple frame image are oriented/processed appropriately to provide inputs for the digital filter at the boundaries of the frames.

Multiple Frame Images

Figure 1:
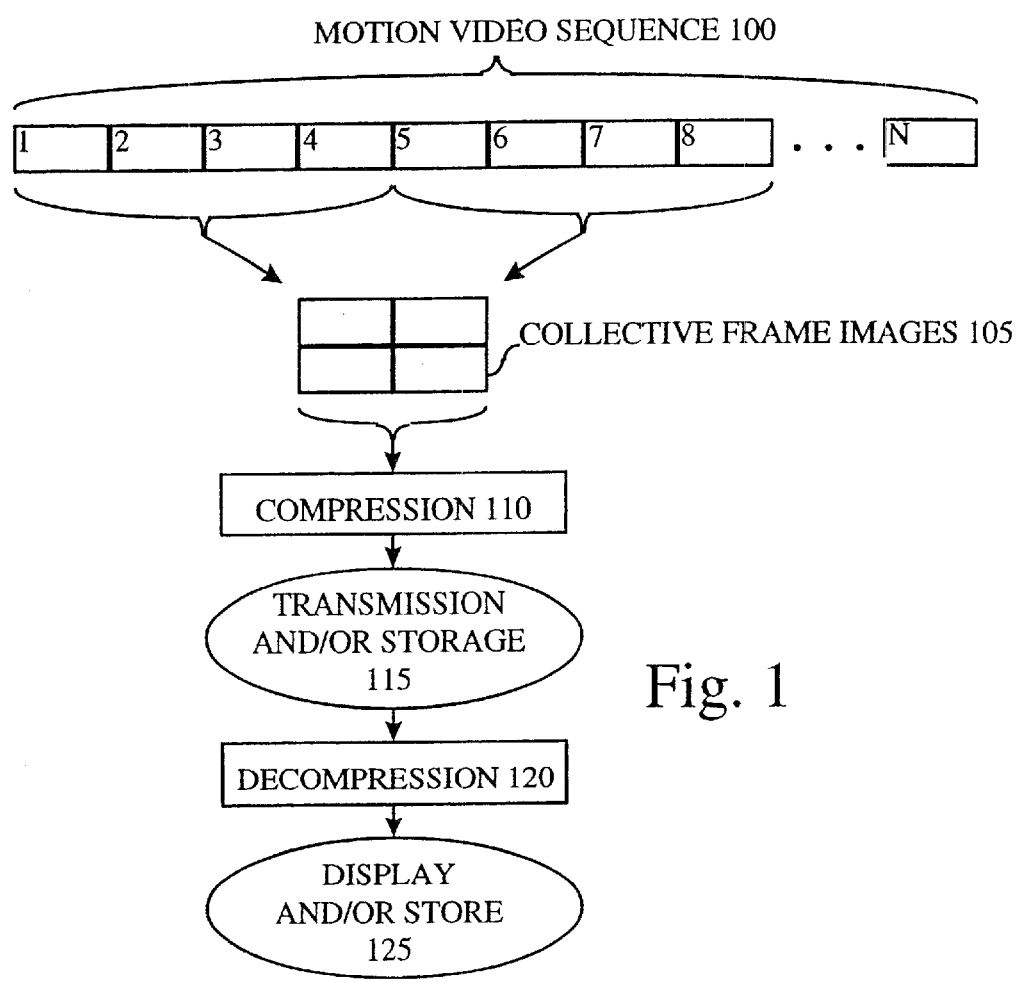
FIG. 1 is a block diagram illustrating a multiple frame image ( or super frame) compression and decompression technique according to one embodiment of the invention.

FIG. 1 is a block diagram illustrating a multiple frame image compression and decompression technique according to one embodiment of the invention. In FIG. 1, a motion video sequence 100 is shown containing frames that are numbered 1 through N. Rather than compressing one pixel, a block of pixels, or a frame at a time, the invention separates at least certain frames of the motion video sequence 100 into a number of different groups, each group forming a multiple frame image (e.g., the frames are divided into groups of four in FIG. 1). Each of the multiple frame images 105 are compressed as a single image or super frame (see compression block 110) to generate compressed motion video data for transmission and/or storage (115). One example of a compression technique based on wavelets is further described later herein. As is well known in the art, the type of compression technique used (110) dictates the type of decompression that must be performed (120). The results (125) of decompressing the motion video sequence can be displayed and/or stored.

While one embodiment is shown in FIG. 1 which groups four frames together to generate each multiple frame image, alternative embodiments could combine more or less frames depending on various factors, such as compression ratio, real-time requirements, etc. For example, a video conferencing application may use groupings of four frames in order to meet the real-time requirements of video conferencing, while an application that delivers a non-real time video (e.g., a movie trailer) could group eight frames together in each multiple frame image.

Furthermore, while one embodiment is shown in which each frame is placed in a multiple frame image, alternative embodiments can compress certain frames as part of multiple frame images and compress other frames individually. Additionally, while one embodiment is illustrated in FIG. 1, in which sequential frames are grouped together to form each multiple frame image, alternative embodiments can group non-sequential (or a mix of sequential and non-sequential) frames to form the multiple frame images. For example, one alternative embodiment groups every other frame to form the multiple frame images.

In addition, while one embodiment is described in which the same compression technique is used to compress the frames of a motion video sequence as multiple frame images, alternative embodiments can use different compression techniques for multiple frame images and/or for selected individual frames. For example, one alternative embodiment uses a combination of: 1) subband decomposition using wavelets on selected multiple frame images formed with non-sequential frames; and 2) block decompression on the remaining frames. As another example, one alternative embodiment uses a combination of: 1) pixel compression on the first frame; 2) block compression on the next three frames; 3) subband decomposition using wavelets on selected multiple frame images; and 4) block compression on the remaining frames. Thus, the concept of compressing a group of frames as a multiple frame image can be used in any number of different compression schemes that use any combination of different compression techniques.

In summary, one aspect of the invention described with reference to FIG. 1 is that groups of frames are combined to create multiple frame images, which are then compressed as single images. In addition to achieving a better compression ratio when using certain compression schemes (e.g., wavelets), another advantage of the multiple frame image technique is related to the handling of the boundaries of the frames making up the multiple frame images as described next.

Boundary Processing

As previously described, encoding schemes that use digital filters and/or wavelets have difficulty at the boundaries of the frame being compressed due to a lack of data values required beyond the boundary of that frame. While any technique (e.g., those described in the background sections) may be used for processing the boundaries of the frames in the multiple frame images when using digital filters and/or wavelets, one embodiment of the invention uses another aspect of the invention described here.

Figure 2A:
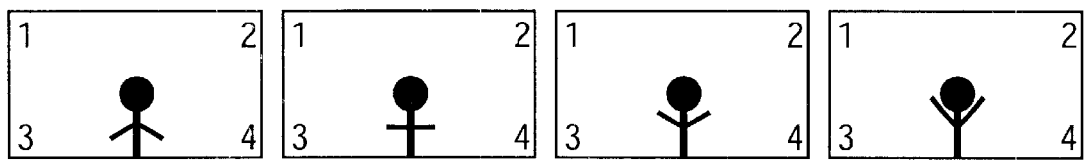
FIG. 2A is a block diagram illustrating an exemplary motion video sequence.

It was determined that the pixels along a given boundary of a given frame are often similar or the same as the corresponding pixels along the same boundary of a different frame in the motion video sequence. To provide an example, the boundary pixels between different frames of a video conference are often the same because the camera and background image are fixed. As a result, the left boundary pixels of one frame will often be quite similar or the same as the left boundary pixels of other frames of a video conference. To provide an example, FIG. 2A is a block diagram illustrating exemplary frames of a motion video sequence, which may or may not be sequential frames. Of course this commonality of boundaries exists in many different types of motion video (e.g., movies, television, etc.). Based on the commonality of the boundaries of different frames, another aspect of the invention is to orient the frames in the multiple frame image such that each frame boundary that lies within the multiple frame image is adjacent to the same boundary of another frame.

Figure 2B:
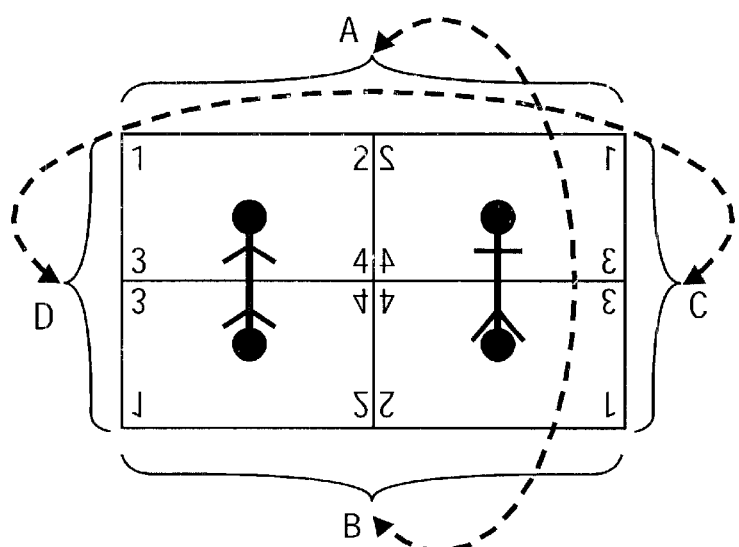
FIG. 2B is a block diagram illustrating a technique for processing the boundaries a multiple frame image (or super frame) composed of frames in the exemplary motion video sequence of FIG. 2A according to one embodiment of the invention.

In particular, FIG. 2B is a block diagram illustrating a technique for processing the boundaries of a multiple frame image composed of the exemplary motion video sequence of FIG. 2A according to one embodiment of the invention. The four corners of each frame shown in FIG. 2A are numbered 1–4 from left-to-right top-to-bottom. FIG. 2B shows that the first frame is placed in the upper left-hand corner of the multiple frame image and has the same orientation as it did in the motion video sequence. In contrast, the second frame is rotated about its vertical axis 180 degrees and placed in the upper right-hand corner of the multiple frame image (illustrated by the backwards 1–4 corner labels). As a result, the right boundaries of both the first and second frames are now adjacent in the multiple frame image.

Similarly, the third frame is rotated about its horizontal axis 180 degrees and placed in the lower left-hand corner of the multiple frame image (illustrated by the up-side-down 1–4 corner labels). As a result, the bottom boundary of the first and third frames are adjacent. In addition, the fourth frame is placed in the lower right-hand corner and is rotated about its horizontal and vertical axis 180 degrees (illustrated by the up-side-down and backwards 1–4 corner labels). As a result, the bottom boundary of the second and fourth frames are adjacent, and the left boundary of the third and fourth frames are adjacent.

In the typical case where the pixels along the boundaries of the frames in the motion video sequence are similar (if not the same), there will be a smooth transition between the adjacent boundaries of the first, second, third, and fourth frames as oriented in FIG. 2B. Thus, the boundaries of the frames that lie on the interior of the multiple frame image no longer have the problem previously associated with a lack of data values for the digital filter.

Furthermore, the filter is performed on the multiple frame image such that the boundaries of the multiple frame image are treated as if they are adjacent to the spatially opposite boundary of the multiple frame image. As illustrated in FIG. 2B, the top boundary A is treated as adjacent to the bottom boundary B, while the right boundary C is treated as adjacent to the left boundary D. In other words, if a digital filter is performed that requires pixel values above the top boundary A of the multiple frame image, the pixels along the bottom boundary B are used. By causing the processing of the multiple frame image to wrap around when the boundaries of the multiple frame image are being processed, the boundaries of the individual frames that lie on the exterior of the multiple frame image are also made adjacent to the same boundary of another frame. For example, the top boundary of the first frame is processed such that it is adjacent to the top boundary of the third frame. Similarly, the multiple frame image is processed such that the left boundary of the first frame is adjacent to the left boundary of the second frame.

In summary, by both grouping frames together into a single multiple frame image and orienting/processing the frames in that multiple frame image properly, the pixels along the boundary of a given frame are treated as adjacent to the pixels along the same boundary of a different frame. This is advantageous over the techniques described in the background because: 1) using zeros for the nonexistent filter inputs adversely affects the filters results; 2) the pixels along a given frame boundary are more likely to be similar to the pixels along the same boundary of a different frame, than to be similar to the pixels on the opposite boundary of the same frame (the circular convolution scheme described in the background); 3) different wavelet calculations are not required along the boundaries of the frames; and 4) additional mirrored pixels need not be compressed as in the prior art technique described with reference to Table 1.

As similarly described with reference to FIG. 1, although FIG. 2 shows a group of four frames, alternative embodiments could group more or less than four frames together. Furthermore, while FIG. 2 illustrates one way in which the frames may be processed and/or oriented, alternative embodiments can process and/or orient the frames in a number of different ways such that at least one boundary of one frame is processed as if it were adjacent to the same boundary of another frame.

Exemplary System

Figure 3:
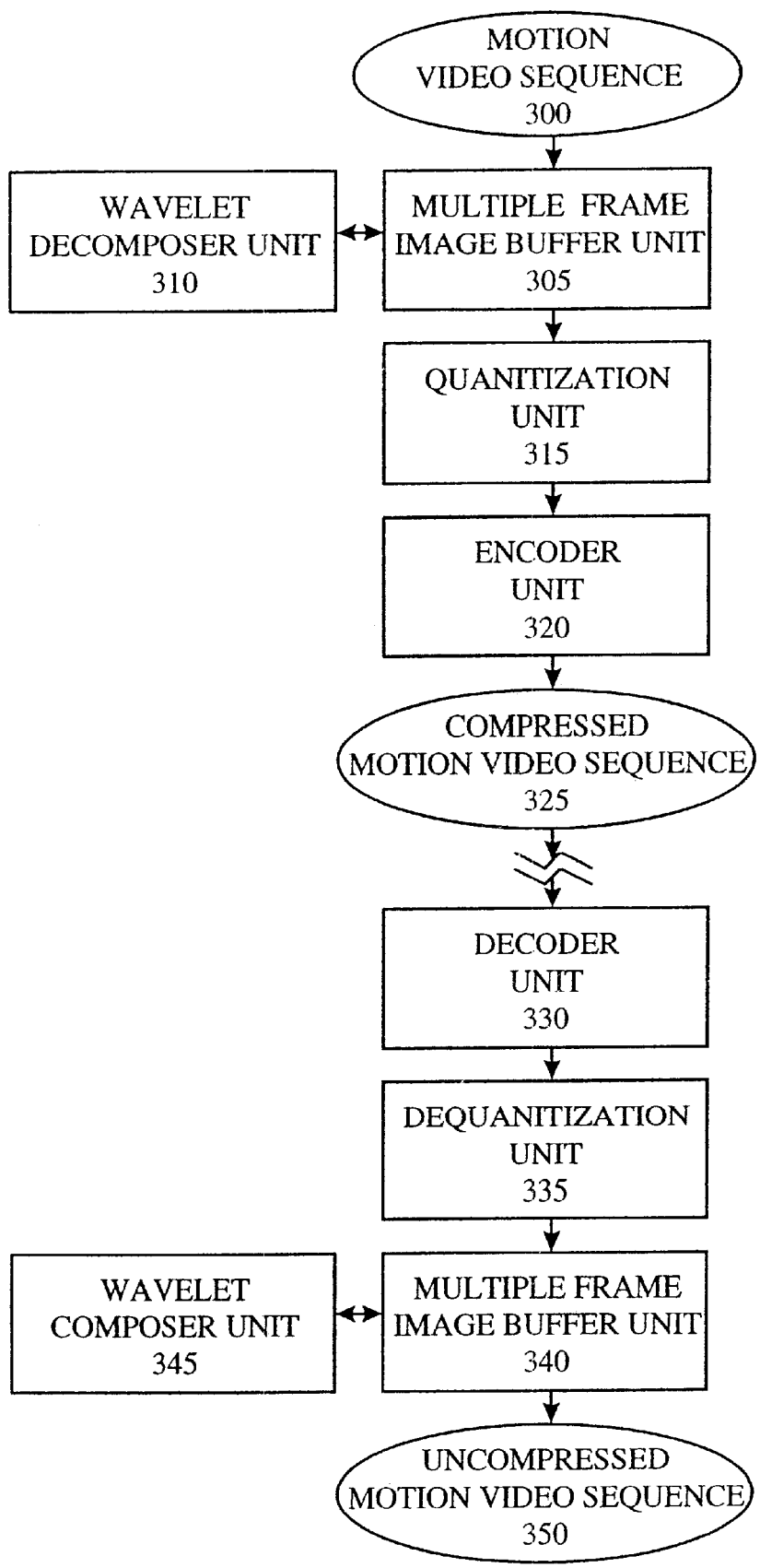
FIG. 3 is a block diagram illustrating an exemplary system for performing multiple frame image (or super frame) compression and decompression according to one embodiment of the invention.

FIG. 3 is a block diagram illustrating an exemplary system for performing multiple frame image compression and decompression according to one embodiment of the invention. As illustrated in FIG. 3, a motion video sequence 300 is received in a multiple frame image buffer unit 305. In one embodiment, the multiple frame image buffer unit 305 includes an "in place" buffer having one or more additional rows and columns than is required to store a multiple frame image. The additional row(s) and column(s) are used to store the results of the digital filter such that the pixels of the original multiple frame image are not overwritten until they are no longer needed. In operation, the multiple frame image is stored starting at the upper left-hand corner of the buffer such that there are one or more unused rows and columns respectively along the right and bottom sides of buffer. Then, the results of the first pass of the digital filter are stored starting at the lower right-hand corner of the buffer. In an alternative embodiment of the invention, two or more buffers are provided, where the output of the digital filter being performed on the contents of one of the multiple frame image buffers is stored in a different buffer. In yet another alternative embodiment, a separate buffer is provided for each frame and logic is used to allow processing of the frames as a single multiple frame image. Of course, other embodiments could implement the multiple frame image buffer unit 305 any number of different ways.

Regardless of the manner in which the multiple frame image buffer unit 305 is implemented, certain embodiments of the invention include logic in the multiple frame image buffer unit 305 to store the frames in the correct orientation (e.g., to orient the frames as illustrated in FIG. 2B). Of course, alternative embodiments can store the frames in the buffer in any number of different ways. For example, an alternative embodiment can store all the frames in the same orientation and use addressing logic to determine the order for inputting the pixels to the filter.

As shown in FIG. 3, the filter performed by the exemplary system on the multiple frame image is a wavelet decomposition (wavelet decomposer unit 310). Of course, alternative embodiment could use different filters. While one embodiment is described in which the results of the wavelet decomposer unit 310 are stored in a buffer of the multiple frame image buffer unit 305, alternative embodiments could store the results in a separate buffer. After decomposition, a quantization unit 315 uses one or more different quantizers to quantize at least certain of the results of the wavelet decomposer 310. Since the quantizer(s) supported by the quantization unit 315 and the technique for selecting between those quantizers are not critical to the invention, additional details of the quantization unit 315 will not be further discussed herein.

The results of the quantization unit 315 are then processed by an encoder unit 320. As with the quantization unit 315, any number of different coding techniques may be supported and/or selected from as part of the operation of the encoder unit 320. Since the encoders supported by the encoder unit 320 and the technique for selecting from those encoders are not critical to the invention, these concepts will not further be described herein. The output of the encoder unit 320 is a compressed motion video sequence 325.

While any number of different operations can be performed on the compressed motion video sequence 325 (e.g., storage, transmission, etc.), the compressed motion video sequence 325 will often be decompressed. FIG. 3 also illustrates logic units for performing such decompression. It should be appreciated that since decompression generally performs the inverse of operations performed in compression, for every alternative compression technique, there is a corresponding decompression technique.

In FIG. 3, the compressed motion video sequence 325 is received by a decoder unit 330. The decoder unit 330 decodes the compressed motion video sequence and provides its output to a dequantization unit 335. The dequantization unit 335 performs the inverse of the quantization performed during compression and stores its output in a multiple frame image buffer unit 340. As previously described with reference to the multiple frame image buffer unit 305, the multiple frame image buffer unit 340 can be implemented a number of different ways.

The inverse of the filtering operation performed during compression is then performed on the dequantized data stored in the multiple frame image buffer unit 340. Since FIG. 3 illustrates an embodiment in which a wavelet decomposition was performed, FIG. 3 includes a wavelet composer unit 345 which performs the inverse filtering operation. As a result, the uncompressed motion video sequence 350 is output.

While a wavelet based compression scheme is described which uses quantization and encoding, alternative embodiments could use other wavelet coefficient compression techniques. Furthermore, while a wavelet based compression scheme is shown in FIG. 3, alternative embodiments could use a different compression scheme and/or combination of compression schemes (e.g., the variety of combination compression schemes previously described).

Figure 4:
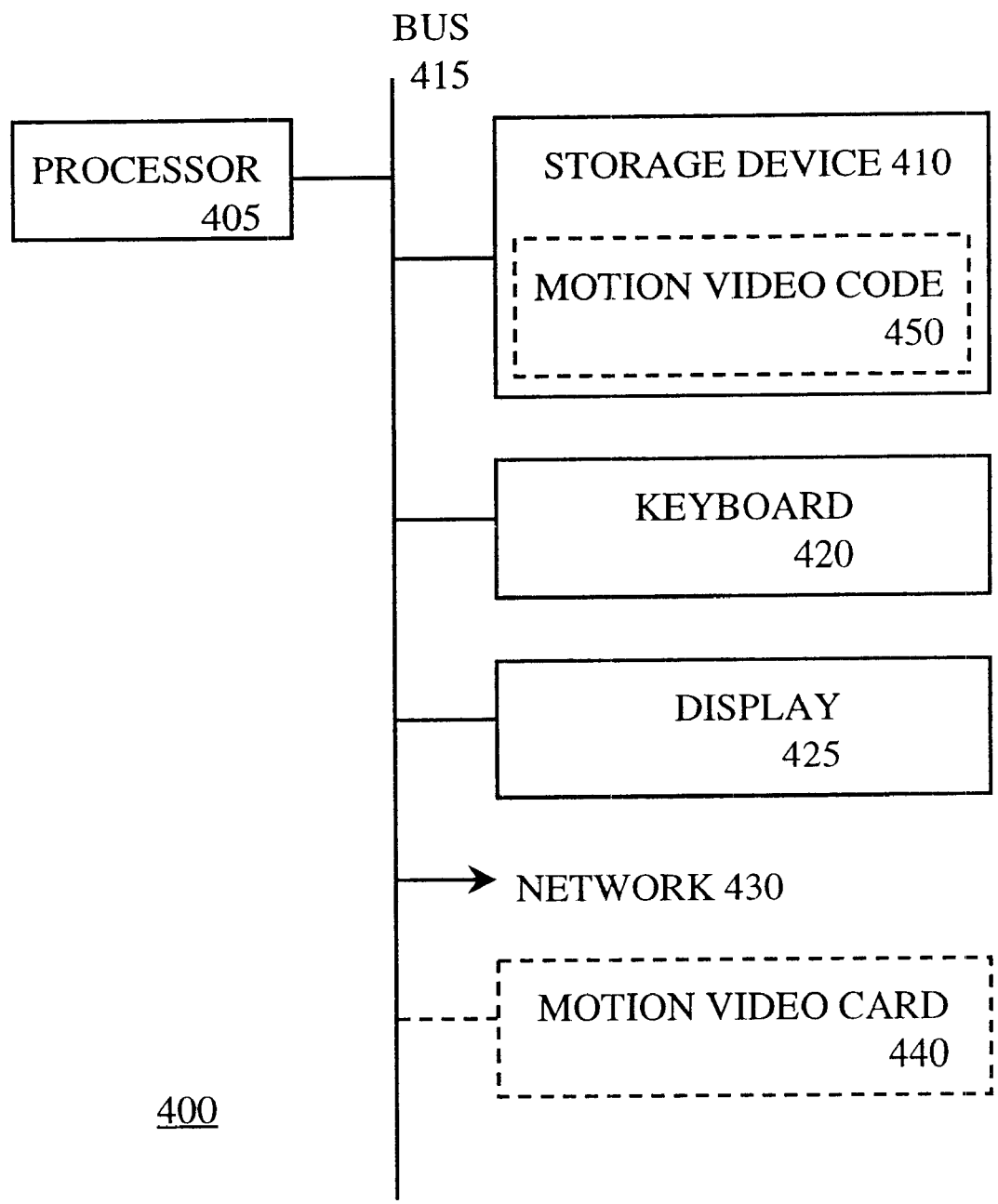
FIG. 4 shows a block diagram illustrating an exemplary computer system 400 within which the units of FIG. 3 may be implemented according to one embodiment of the invention.

FIG. 4 shows a block diagram illustrating an exemplary computer system 400 within which the units of FIG. 3 may be implemented according to one embodiment of the invention. The exemplary computer system 400 includes a processor 405 coupled to a storage device 410 by a bus 415. In addition, a number of user input/output devices, such as a keyboard 420 and a display 425, may also be coupled to the bus 415. Also, a network 430 may also be coupled to bus 415 to communicate information (e.g., carrier ways). The processor 405 represents a central processing unit of any type of architecture (e.g., CISC, RISC, VLIW, or hybrid architecture). The bus 415 represents one or more busses (e.g., PCI, ISA, X-Bus, EISA, VESA, etc.) and bridges (also termed as bus controllers). The storage device 410 represents one or machine readable media for storing data. While a single processor computer system is illustrated, the invention could be implemented in a multi-processor computer system.

Different embodiments of the invention can implement the different units illustrated in FIG. 3 using various combinations of hardware, firmware, and/or software. For example, a card containing dedicated hardware/firmware/software (e.g., the multiple frame image buffers(s), wavelet decomposer/composer, quantization/dequantization unit, and encoder/decoder unit) could be connected via a bus in a standard PC configuration (e.g., motion video card 440 in FIG. 4). Alternatively, dedicated hardware/firmware/software could be connected to a standard PC configuration via one of the standard ports (e.g., the parallel port). In yet another alternative embodiment, the main memory (including caches) and host processor(s) of a standard computer system could be used to implement the operations required (e.g., the multiple frame image buffer(s) could be implemented by main memory, and/or the wavelet decomposition and/or composition could be implemented by sequences of instructions executed by a host processor—e.g., motion video code 450). Where software is used to implement all or part of the invention, the sequences of instruction can be stored on a "machine readable medium," such as read only memory (ROM), random access memory (RAM), magnetic disk storage media, optical storage media, flash memory devices, carrier waves received over a network, etc. Thus, it is understood by one of ordinary skill in the art that various combinations of hardware, firmware, and/or software can be used to implement the various aspects of the invention.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method of compressing frames of a motion video sequence, said method comprising:

digitally filtering a plurality of frames in said motion video sequence as a single image to generate a plurality of parts, wherein said digitally filtering includes processing said plurality of frames such that at least one boundary of at least one of said plurality of frames that is on the interior of said single image is adjacent to a boundary at the same spatial location in another of said plurality of frames; and encoding at least some of said plurality of parts to generate compressed data.

2. The method of claim 1, wherein said digitally filtering includes processing said plurality of frames such that the boundary of each frame is adjacent to a boundary in the same spatial location of another of said plurality of frames.

3. The method of claim 1, wherein said digitally filtering includes processing said plurality of frames such that at least one exterior boundary of said single image is adjacent to the spatially opposite exterior boundary of said single image.

4. The method of claim 1, wherein said digitally filtering includes processing a boundary of said single image by wrapping around to the spatially opposite boundary of said single image.

5. The method of claim 1, wherein said digitally filtering includes performing one or more wavelet decompositions.

6. The method of claim 1, further including storing said plurality of frames in a frame buffer.

7. A machine readable medium having stored thereon sequences of instructions, which when executed by a processor, cause the processor to perform operations comprising:

digitally filtering a plurality of frames in a motion video sequence as a single image to generate a plurality of parts, wherein said digitally filtering includes processing said plurality of frames such that at least one boundary of at least one of the plurality of frames that is on the interior of said single image is adjacent to a boundary at the same spatial location in another of said plurality of frames; and encoding at least some of said plurality of parts to generate compressed data.

8. The machine readable medium of claim 7, wherein said digitally filtering includes: processing said plurality of frames such that the boundary of each frame is adjacent to a boundary in the same spatial location of another of said plurality of frames.

9. The machine readable medium of claim 7, wherein said digitally filtering includes processing said plurality of frames such that at least one of the exterior boundaries of said single image is adjacent to the spatially opposite exterior boundary of said single image.

10. The machine readable medium of claim 7, wherein said digitally filtering includes processing a boundary of said single image by wrapping around to the spatially opposite boundary of said single image.

11. The machine readable medium of claim 7, wherein said digitally filtering includes performing one or more wavelet decompositions.

12. A method of compressing frames of a motion video sequence, said method comprising:

storing groups of frames of said motion video sequence in a frame buffer, wherein said storing includes orienting each group of frames such that at least one boundary of said frames that is on the interior of said single image is adjacent to a boundary at the same spatial location in another of said frames;

decomposing each group of frames stored in said frame buffer as a frame image to generate a plurality of wavelet coefficients; and compressing at least some of said plurality of wavelet coefficients to generate a compressed data representing said motion video sequence.

13. The method of claim 12, wherein said decomposing includes processing a boundary of said single image by wrapping around to the spatially opposite boundary.

14. The method of claim 12, wherein said decomposing includes processing each group of frames such that the boundary of each frame is adjacent to the same boundary of another frame.

15. The method of claim 12, wherein said decomposing includes processing said single image wherein at least one pixel on the boundary of at least one frame is processed such that the at least one pixel is adjacent to a pixel at the same spatial location in another of frame in that group of frames.

16. The method of claim 12, wherein said compressing includes, quantizing at least some of said plurality of wavelet coefficients; and encoding the results of said quantizing.

17. A computer system comprising:

a processor; and a memory, coupled to said processor, to include a buffer, the buffer to store a plurality of frames of a motion video sequence;

a plurality of instructions , which when executed by said processor, cause said processor to:

decompose said single multiple frame image to generate a plurality of wavelet coefficients, wherein the decomposition comprises processing said plurality of frames wherein at least one boundary of said plurality of frames that is on the interior of said single image is adjacent to a boundary at the same spatial location in another of said plurality of frames; and compress at least some of said plurality of wavelet coefficients to generate compressed data representing said motion video sequence.

18. The computer system of claim 17, wherein the decomposition comprises processing plurality of frames wherein at least one boundary of said plurality of frames that is on the exterior of said single image is adjacent to a boundary at the same spatial location in another of said plurality of frames.

19. An apparatus comprising:

a frame buffer for storing a plurality of frames of a motion video sequence;

a digital filter coupled to said frame buffer, the digital filter to decompose the contents of said frame buffer as a single image to generate a plurality of wavelet coefficients, wherein the decomposition comprises processing said plurality of frames wherein at least one boundary of said plurality of frames that is on the interior of the single image is adjacent to a boundary at the same spatial location in another of said plurality of frames;

a quantization unit coupled to said digital filter, the quantization unit to quantize the plurality of wavelet coefficients; and an encoder unit coupled to the output of said quantization unit, the encoder unit to compress the quantized plurality of wavelet coefficients.

20. The apparatus of claim 19, wherein said digital filter processes the contents of said frame buffer such that the boundary of each of said plurality of frames is adjacent to a boundary in the same spatial location of another of said plurality of frames.

21. A method comprising:

storing a part of a compressed motion video sequence that represents a group of frames that were compressed as a single image;

decompressing said part to generate a plurality of wavelet coefficients; and performing the inverse of a filter used during compression on said plurality of wavelet coefficients to generate the single image, wherein said performing the inverse of the filter used during compression includes processing said group of frames such that at least one boundary of said group of frames that is on the interior of said single image is adjacent to a boundary at the same spatial location in another frame in said group of frames.

22. The method of claim 21, wherein said performing the inverse of the filter used during compression includes processing said group of frames such that the boundary of each frame is adjacent to a boundary in the same spatial location of another frame in said group of frames.

23. The method of claim 21, wherein said performing the inverse of the filter used during compression includes processing said group of frames such that at least one of the exterior boundaries of said single image are adjacent to the spatially opposite exterior boundary of said single image.

24. The method of claim 21, wherein said performing the inverse of the filter includes storing the group of frames such that at least one frame boundary that is on the interior of said single image is adjacent to the same boundary in another frame in said group of frames.

25. A machine readable medium having stored thereon sequences of instruction, which when executed by a processor, cause the processor to perform operations comprising:

storing a part of a compressed motion video sequence that represents a group of frames that were compressed as a single image;

decompressing said part to generate a plurality of wavelet coefficients; and performing the inverse of a filter used during compression on said plurality of wavelet coefficients to generate the single image, wherein said performing the inverse of the filter used during compression comprises processing said group of frames such that at least one frame boundary that is on the interior of said single image is adjacent to a boundary at the same spatial location in another of said group of frames.

26. The machine readable medium of claim 25, wherein said performing the inverse of the filter used during compression includes processing said group of frames such that the boundary of each frame is adjacent to a boundary in the same spatial location of another frame in said group of frames.

27. The machine readable medium of claim 25, wherein said performing the inverse of the filter used during compression includes processing said group of frames such that at least one of the exterior boundaries of said single image is adjacent to the spatially opposite exterior boundary of said single image.

28. The machine readable medium of claim 25, wherein said performing the inverse of the filter includes storing the group of frames such that at least one frame boundary that is on the interior of said single image is adjacent to the same boundary in another frame in said group of frames.

29. A computer system comprising:

a processor; and a memory, coupled to said processor, to provide a buffer to decompress a plurality of motion video frames that were compressed as a single image using wavelet based encoding;

a plurality of instructions, which when executed by said processor, cause said processor to perform the inverse of the wavelet based encoding to generate a decompressed version of said single image, wherein the inverse of the wavelet based encoding is performed such that at least one frame boundary that is on the interior of said single image is adjacent to the same boundary of another frame in the decompressed version of said single image.

30. The computer system of claim 29, wherein the inverse of the wavelet based encoding is performed such that at least one boundary of a frame in said single image is adjacent to the same boundary of another frame in said single image.

31. The computer system of claim 29, wherein the wavelet based encoding is performed wherein the boundary of at least one of the plurality of motion video frames is processed such that the at least one of the plurality of motion video frames is adjacent to a boundary in the same spatial location of another of said plurality of motion video frames.

32. An apparatus comprising:

a decoder unit coupled to received compressed data representing a group of frames of a motion video sequence that was compressed as a single image;

a quantization unit coupled to said decoder unit to dequantize the output of the decoder unit into a plurality of wavelet coefficients; and a digital filter coupled to said quantization unit to perform the inverse of the wavelets used during compression to generate said single image, wherein the inverse of the wavelets is performed such that at least one frame boundary that is the interior of said single image is adjacent to the same boundary of another frame boundary of said single image.

33. The computer system of claim 32, wherein the single image was compressed such that the boundary of each frame was adjacent to the same boundary of another frame in the group of frames.

34. A method of compressing multiple frames of a motion video sequence, comprising:

storing the plurality of frames in the motion video sequence as a single image to generate a plurality of parts;

processing the plurality of frames such that at least one boundary of at least one of the plurality of frames that is on the interior of said single image is adjacent to a boundary at the same spatial location in another of said plurality of frames;

encoding at least some of the plurality of parts to generate compressed data; and performing at least one wavelet decomposition.

35. The method of claim 34, wherein processing the plurality of frames is such that the exterior boundaries of the single image are adjacent to the spatially opposite exterior boundary of the single image.

36. The method of claim 34, wherein processing the plurality of frames comprises processing a boundary of the single image by wrapping around to the spatially opposite boundary of the single image.

37. A machine-readable medium that provides instructions, which when executed by a machine, causes the machine to perform operations comprising:

storing the plurality of frames in the motion video sequence as a single image to generate a plurality of parts;

processing the plurality of frames such that at least one boundary of at least one of the plurality of frames that is on the interior of said single image is adjacent to a boundary at the same spatial location in another of said plurality of frames;

encoding at least some of the plurality of parts to generate compressed data; and performing at least one wavelet decomposition.

38. The machine-readable medium of claim 37, wherein processing the plurality of frames is such that the exterior boundaries of the single image are adjacent to the spatially opposite exterior boundary of the single image.

39. The machine-readable medium of claim 37, wherein processing the plurality of frames comprises processing a boundary of the single image by wrapping around to the spatially opposite boundary of the single image.

40. A method of compressing multiple frames of a motion video sequence, comprising:

storing groups of frames of the motion video sequence in a frame buffer;

orienting each group of frames such that each boundary of the frames that is on the interior of the single image is adjacent to a boundary at the same spatial location in another of the frames;

decomposing each group of frames stored in the frame buffer as a frame image to generate a plurality of wavelet coefficients;

compressing at least some of the plurality of wavelet coefficients to generate compressed data representing the motion video sequence;

quantizing at least some of the plurality of wavelet coefficients; and encoding the results of the quantization.

41. The method of claim 40, further comprising processing a boundary of the single image by wrapping around to the spatially opposite boundary.

42. The method of claim 40, further comprising processing each group of frames such that the boundary of each frame is adjacent to the same boundary of another frame.

43. The method of claim 40, further comprising processing of the single image such that each pixel on the boundary of each frame is adjacent to a pixel at the same spatial location in another frame in the group of frames.

44. A machine-readable medium that provides instructions, which when executed by a machine, causes the machine to perform operations comprising:

storing groups of frames of the motion video sequence in a frame buffer;

orienting each group of frames such that each boundary of the frames that is on the interior of the single image is adjacent to a boundary at the same spatial location in another of the frames;

decomposing each group of frames stored in the frame buffer as a frame image to generate a plurality of wavelet coefficients;

compressing at least some of the plurality of wavelet coefficients to generate a compressed data representing the motion video sequence;

quantizing at least some of the plurality of wavelet coefficients; and encoding the results of the quantization.

45. The machine-readable medium of claim 44, further comprising processing a boundary of the single image by wrapping around to the spatially opposite boundary.

46. The machine-readable medium of claim 44, further comprising processing each group of frames such that the boundary of each frame is adjacent to the same boundary of another frame.

47. The machine-readable medium of claim 44, further comprising processing of the single image such that each pixel on the boundary of each frame is adjacent to a pixel at the same spatial location in another frame in the group of frames.

48. A method comprising:

storing a part of a compressed motion video sequence that represents a group of frames that were compressed as a single image, such that each frame boundary that is on the interior of the single image is adjacent to the same boundary in another frame in the group frames;

decompressing the part of a compressed motion video sequence to generate a plurality of wavelet coefficients; and performing the inverse of a filter used during compression on the plurality of wavelet coefficients to generate a single image.

49. The method of claim 48, wherein decompressing the part of the compressed motion video sequence to generate the quality of wavelength coefficients includes processing the group of frames such that the boundary of each frame is adjacent to a boundary in the same spatial locations of another frame in the group of frames.

50. The method of claim 48, wherein decompressing the part of the compressed motion video sequence to generate the plurality of wavelet coefficients includes processing the group of frames such that each boundary of the group of frames that is on the interior of the single image is adjacent to a boundary at the same spatial location in another frame in the group of frames.

51. The method of claim 48, wherein decompressing the part of the compressed motion video sequence to generate the plurality of wavelet coefficients includes processing the group of frames such that the exterior boundaries of the single image are adjacent to the spatially opposite exterior boundary of the single image.

52. A machine-readable medium that provides instructions, which when executed by a machine, causes the machine to perform operations comprising:

storing a part of a compressed motion video sequence that represents a group of frames that were compressed as a single image, such that each frame boundary that is on the interior of the single image is adjacent to the same boundary in another frame in the group frames;

decompressing the part of a compressed motion video sequence to generate a plurality of wavelet coefficients; and performing the inverse of a filter used during compression on the plurality of wavelet coefficients to generate a single image.

53. The machine-readable medium of claim 52, wherein decompressing the part of the compressed motion video sequence to generate the plurality of wavelet coefficients includes processing the group of frames such that the boundary of each frame is adjacent to a boundary in the same spatial locations of another frame in the group of frames.

54. The machine-readable medium of claim 52, wherein decompressing the part of the compressed motion video sequence to generate the plurality of wavelet coefficients includes processing the group of frames such that each boundary of the group of frames that is on the interior of the single image is adjacent to a boundary at the same spatial location in another frame in the group of frames.

55. The machine-readable medium of claim 52, wherein decompressing the part of the compressed motion video sequence to generate the plurality of wavelet coefficients includes processing the group of frames such that the exterior boundaries of the single image are adjacent to the spatially opposite exterior boundary of the single image.

56. A machine readable medium having stored thereon sequences of instructions, which when executed by a processor, cause the processor to perform operations comprising:

storing groups of frames of a motion video sequence in a frame buffer, wherein said storing includes orienting each group of frames such that at least one boundary of said frames that is on the interior of said single image is adjacent to a boundary at the same spatial location in another of said frames;

decomposing each group of frames stored in said frame buffer as a frame image to generate a plurality of wavelet coefficients; and compressing at least some of said plurality of wavelet coefficients to generate a compressed data representing said motion video sequence.

57. The machine readable medium of claim 56, wherein said decomposing includes processing a boundary of said single image by wrapping around to the spatially opposite boundary.

58. The machine readable medium of claim 56, wherein said decomposing includes processing each group of frames such that the boundary of each frame is adjacent to the same boundary of another frame.

59. The machine readable medium of claim 56, wherein said decomposing includes processing said single image wherein at least one pixel on the boundary of at least one frame is processed such that the at least one pixel is adjacent to a pixel at the same spatial location in another of frame in that group of frames.

60. The machine readable medium of claim 56, wherein said compressing includes, quantizing at least some of said plurality of wavelet coefficients; and encoding the results of said quantizing.

61. The computer system of claim 17, wherein the decomposition comprises processing a boundary of said single image by wrapping around to the spatially opposite boundary of said single image.

62. The computer system of claim 17, wherein the decomposition comprises processing said plurality of frames wherein at least one boundary of said plurality of frames that is on the exterior of said single image is adjacent to a boundary at the same spatial location in another of said plurality of frames.

63. The apparatus of claim 19, wherein said digital filter is to process a boundary of said single image by wrapping around to the spatially opposite boundary of said single image.

64. The apparatus of claim 19, wherein the decomposition comprises processing said plurality of frames wherein at least one boundary of said plurality of frames that is on the exterior of the single image is adjacent to a boundary at the same spatial location in another of said plurality of frames.

65. The computer system of claim 29, wherein the inverse of the wavelet based encoding is performed such that each frame boundary that is on the exterior of said single image is adjacent to the same boundary of another frame of said single image.

66. The apparatus of claim 32, wherein the inverse of the wavelets is performed such that each frame boundary that is on the exterior of said single image is adjacent to the same boundary of another frame of said single image.

* * * * *